United States Patent
Zhang et al.

(10) Patent No.: US 9,674,800 B2
(45) Date of Patent: Jun. 6, 2017

(54) POWER SCALING FOR MULTI-CARRIER HIGH-SPEED UPLINK PACKET ACCESS

(75) Inventors: Danlu Zhang, San Diego, CA (US); Pavan Kumar Vitthaladevuni, San Diego, CA (US); Jilei Hou, San Diego, CA (US); Ozcan Ozturk, San Diego, CA (US); Arjun Bharadwaj, San Diego, CA (US); Ravi Agarwal, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 12/719,771

(22) Filed: Mar. 8, 2010

(65) Prior Publication Data

US 2010/0322090 A1    Dec. 23, 2010

Related U.S. Application Data

(60) Provisional application No. 61/218,315, filed on Jun. 18, 2009.

(51) Int. Cl.
*H04W 52/04* (2009.01)
*H04W 24/00* (2009.01)
(Continued)

(52) U.S. Cl.
CPC ......... *H04W 52/42* (2013.01); *H04W 52/346* (2013.01); *H04W 52/286* (2013.01)

(58) Field of Classification Search
CPC .. H04W 52/42; H04W 52/346; H04W 52/286
(Continued)

(56) References Cited

U.S. PATENT DOCUMENTS 5,991,284 A    11/1999   Willenegger et al.
6,570,929 B1 *  5/2003   Eriksson ................. 375/260
(Continued)

FOREIGN PATENT DOCUMENTS

CN         1836392 A     9/2006
CN       101170332 A     4/2008
(Continued)

OTHER PUBLICATIONS

Ericsson: "DC-HSUPA power scaling" 3GPP Draft; R1-091894 DC-HSUPA Power Scaling, 3rd Generation Partnership Project (3GPP), Mobile Competence Centre ; 650, Route Des Lucioles ; F-06921 Sophia-Antipolis Cedex ; France, no. San Francisco, USA; Apr. 28, 2009, Apr. 28, 2009 (Apr. 28, 2009), XP050339385.

(Continued)

*Primary Examiner* — Luat Phung
(74) *Attorney, Agent, or Firm* — Darren M. Simon

(57) ABSTRACT

A method for wireless communications is provided. The method includes applying independent power controls to two or more carriers from a set of high speed packet access signals. The method includes monitoring power across the two or more carriers to determine power levels for the set of high speed packet access signals. The method also includes automatically scaling at least one of the independent power controls in view of the determined power levels for the set of high speed packet access signals. The method also includes setting the minimum power offset of the data channel independently on each carrier.

30 Claims, 13 Drawing Sheets

(51) Int. Cl.
*H04W 52/42* (2009.01)
*H04W 52/34* (2009.01)
*H04W 52/28* (2009.01)

(58) Field of Classification Search
USPC .................. 370/252, 329, 335, 336; 455/522
See application file for complete search history.

(56) References Cited

U.S. PATENT DOCUMENTS

| | | | |
|---|---|---|---|
| 6,785,558 B1* | 8/2004 | Stratford et al. | 455/561 |
| 2001/0006888 A1 | 7/2001 | Posti et al. | |
| 2005/0107106 A1 | 5/2005 | Valkealahti et al. | |
| 2006/0003787 A1* | 1/2006 | Heo et al. | 455/522 |
| 2006/0270431 A1 | 11/2006 | Yoshi et al. | |
| 2007/0019589 A1 | 1/2007 | Attar et al. | |
| 2007/0077956 A1 | 4/2007 | Julian et al. | |
| 2007/0173278 A1 | 7/2007 | Yoon et al. | |
| 2009/0010213 A1 | 1/2009 | Yamada et al. | |
| 2009/0168686 A1 | 7/2009 | Love et al. | |
| 2010/0113004 A1* | 5/2010 | Cave | H04W 52/365 455/422.1 |
| 2010/0202331 A1 | 8/2010 | Zhang et al. | |
| 2010/0238825 A1 | 9/2010 | Zhang et al. | |
| 2010/0273520 A1* | 10/2010 | Pelletier et al. | 455/522 |

FOREIGN PATENT DOCUMENTS

| | | |
|---|---|---|
| CN | 100405753 C | 7/2008 |
| CN | 101366212 A | 2/2009 |
| CN | 101378275 A | 3/2009 |
| EP | 1195034 A1 | 4/2002 |
| EP | 1341318 A2 | 9/2003 |
| EP | 1655868 A1 | 5/2006 |
| EP | 1655989 A2 | 5/2006 |
| EP | 1681781 A2 | 7/2006 |
| EP | 1793059 A2 | 6/2007 |
| EP | 1793509 A1 | 6/2007 |
| EP | 1446897 B1 | 8/2008 |
| JP | 2005045504 A | 2/2005 |
| JP | 2009505446 A | 2/2009 |
| JP | 2009505564 A | 2/2009 |
| KR | 20060132786 A | 12/2006 |
| RU | 2006108531 A | 7/2006 |
| WO | 2005018125 A1 | 2/2005 |
| WO | 2010068487 | 6/2010 |

OTHER PUBLICATIONS

International Search Report and Written Opinion—PCT/US2010/027656, International Search Authority—European Patent Office—Jun. 21, 2010.

Nokia et al: "Power scaling in dual carrier HSUPA" 3GPP Draft; R1-092080, 3rd Generation Partnership Project (3GPP), Mobile Competence Centre ; 650, Route Des Lucioles ; F-06921 Sophia-Antipolis Cedex; France, no. San Francisco, USA; Apr. 29, 2009, Apr. 29, 2009 (Apr. 29, 2009 ), XP050339531.

Taiwan Search Report—TW099108054—TIPO—Feb. 18, 2013.

* cited by examiner

POWER SCALING FOR MULTI-CARRIER HIGH-SPEED UPLINK PACKET ACCESS

CLAIM OF PRIORITY UNDER 35 U.S.C. §119

This application claims the benefit of U.S. Provisional Patent Application No. 61/218,315, entitled POWER CONTROL IN MULTI-CARRIER HSUPA, and filed on Jun. 18, 2009, the entirety of which is incorporated herein by reference.

BACKGROUND

I. Field

The following description relates generally to wireless communications systems, and more particularly to power scaling of multiple carriers for High-Speed Uplink Packet Access (HSUPA).

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems. Still yet another system includes Wideband Code Division Multiple Access (WCDMA).

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

One issue with wireless systems relates to multicarrier controls for high-speed uplink packet access (HSUPA). In general, HSUPA employs a packet scheduler, but operates on a request-grant principle where user equipment or devices can request permission to send data and a scheduler decides when and how many devices will be allowed to do so. A request for transmission contains data about the state of the transmission buffer and queue at the device and its available power margin. In addition to this scheduled mode of transmission applicable standards also allow a self-initiated transmission mode from the devices, denoted non-scheduled. With respect to transmitted power and multicarrier control however, previous systems were only able to achieve such control via power controls that were universally applied to all carriers. This type of non-independent control over the carriers made it difficult to regulate power among the carriers and control interference between devices and/or channels. Moreover, in addition to non-independent control, multicarrier control systems did not have the capability to properly scale power allocations between carriers when conditions dictated. Such lack of control independence and scaling made it exceedingly difficult to deliver the quality of service desired.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods are provided to control power settings across multiple wireless carriers in an independent manner for high-speed packet access networks. In one aspect, a power control method for wireless carriers is provided, where independent closed-loop controls can be applied to one or more carriers of a multicarrier set. The method includes responding to power up and power down commands across multiple carriers and dividing allowed power allocation across at least two wireless carriers in response to the power up and power down commands. In another aspect, the method includes ranking the carrier channels in a sequential manner according to a preference and assigning power to the channels according to the ranking In one example, the ranking can be based off of a signal quality parameter. In yet another aspect, the method includes analyzing power properties across the group of carrier channels in a parallel manner and assigning power to the channels according to the properties of the group. Dynamic ranking and power analysis can be applied where channels are evaluated over time and ranked or assigned power based on the evaluation or monitoring. In addition to being able to control power across multiple carriers independently, power scaling algorithms can be applied in a sequential or parallel manner across multiple carriers to facilitate that maximum combined power is not exceeded for a given collection of carriers.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to control power across multiple carriers in a wireless network. In one aspect, a method for wireless communications is provided. The method includes applying independent power controls to two or more carriers from a set of high speed packet access signals. The method includes monitoring power across the two or more carriers to determine power levels for the set of high speed packet access signals. The method also includes automatically scaling at least one of the independent power controls in view of the determined power levels for the set of high speed packet access signals.

It is noted that in one or more exemplary embodiments described herein, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

Figure 1:
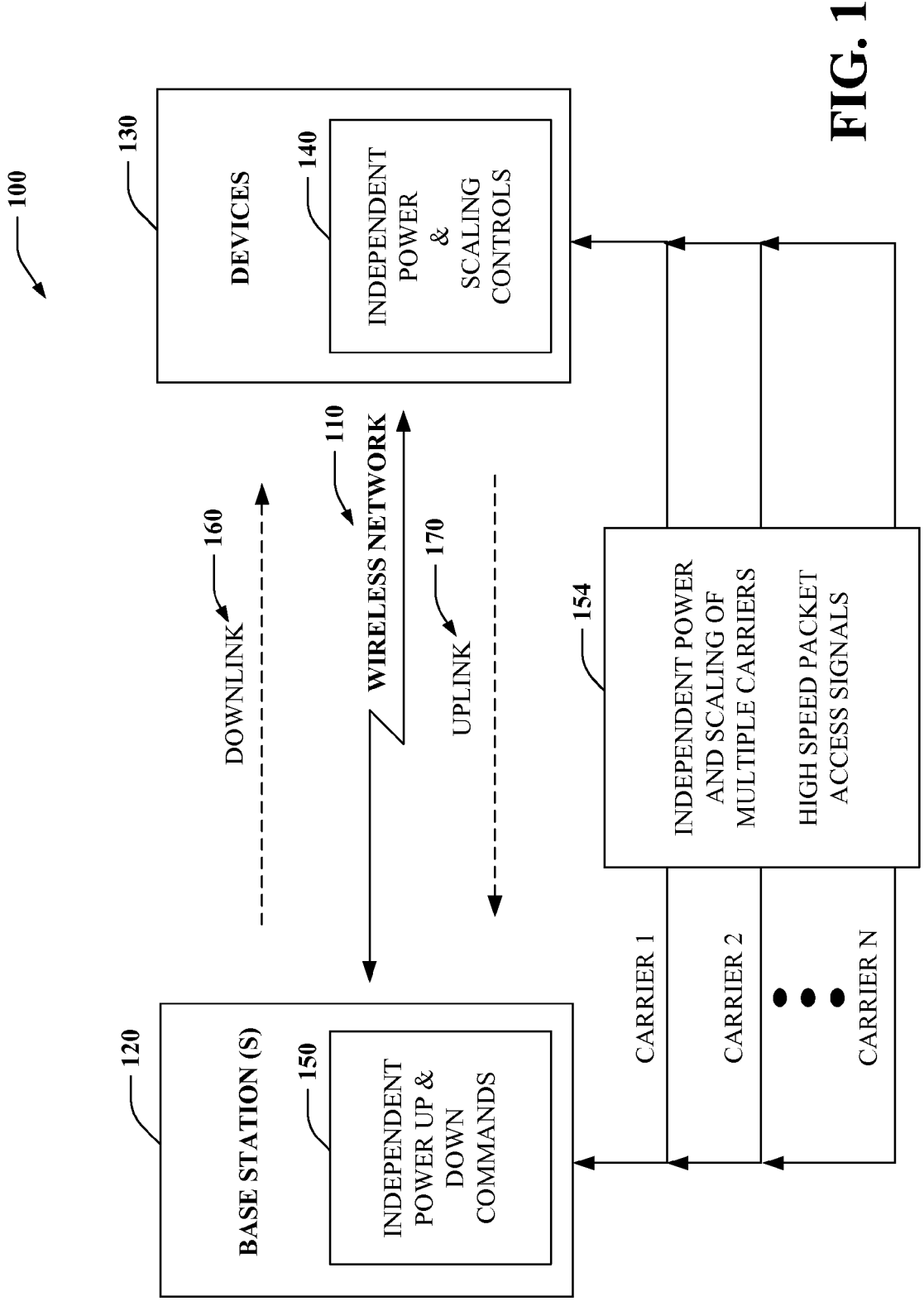
FIG. 1 is a high level block diagram of a system that provides independent multicarrier power control and scaling for a wireless communications system.

Referring now to FIG. 1, a system 100 provides multi-carrier power control for a wireless communications network 110, where closed loop controls are employed to regulate transmit power of user equipment in an independent manner between multiple carriers. The system 100 includes one or more base stations 120 (also referred to as a node, evolved node B-eNB, serving eNB, target eNB, femto station, pico station) which can be an entity capable of communication over the wireless network 110 to various devices 130. For instance, each device 130 can be an access terminal (also referred to as terminal, user equipment, mobility management entity (MME) or mobile device). The device 130 can include independent power and scaling controls 140 that are provided to manage power across multiple wireless carriers. Such controls 140 respond to power up or down commands 150 emanating from the base station 120. For instance, at 154, various carriers may be generated that are independently controlled by the controls 140 (e.g., each carrier having separate closed loop control).

As shown, the base station 120 communicates to the device 130 (or devices) via downlink 160 and receives data via uplink 170. Such designation as uplink and downlink is arbitrary as the device 130 can also transmit data via downlink and receive data via uplink channels. It is noted that although two components 120 and 130 are shown, that more than two components can be employed on the network 110, where such additional components can also be adapted for the power control described herein. It is further noted that although the controls 140 typically apply to a high speed uplink packet access (HSUPA) systems, such controls can also apply to high speed downlink packet access (HSDPA) or other wireless protocols as well.

In general, the controls 140 regulate power settings across multiple wireless carriers in an independent manner for high-speed packet access networks. In one aspect, a power control method for wireless carriers is provided, where independent closed-loop controls 140 can be applied to one or more carriers of a multicarrier set. The method includes responding to power up and power down commands 150 across multiple carriers and dividing allowed power allocation across at least two wireless carriers in response to the power up and power down commands. In another aspect, the method includes ranking the carrier channels in a sequential manner according to a preference and assigning power to the channels according to the ranking In one example, the ranking can be based off of a signal quality parameter. In yet another aspect, the method includes analyzing power properties across the group of carrier channels in a parallel manner and assigning power to the channels according to the properties of the group. Dynamic ranking and power analysis can be applied where channels are evaluated over time and ranked or assigned power based on the evaluation or monitoring. In addition to being able to control power across multiple carriers independently, power scaling algorithms as will be described in more detail with respect to FIGS. 2-5 can be applied in a sequential or parallel manner across multiple carriers to facilitate that maximum combined power is not exceeded at the user equipment 130 for a given collection of carriers.

Generally, rules or policies should be specified with multiple carriers for power scaling when the UE or device 130 does not have enough power to obey power control 'up' commands at 150. Typically, the UE 130 first combines radio power control (RPC) commands from the cells in its active set. If the command is 'up' and the UE 130 does not have the power to support it, power scaling is applied. Generally, enhanced dedicated physical data channel (E-DPDCH) power is first reduced where other powers are scaled equally such that the ratios among them are maintained, and where RPC is independent on each carrier. Rules for scaling E-DPDCH can be applied where the UE 130 statically divides its maximum transmit power among carriers in one aspect.

In another aspect, greedy filling algorithms can be applied where the carriers are ordered by preference which could depend on channel quality, grant, current data rates and status of anchor or non-anchor carriers, for example. Generally, the 'down' command at 150 is applied first where the carriers with the 'up' command can receive transmit power at least unchanged. The remaining power can be computed and distributed among the carriers with 'up' command. Transmit power on each carrier can be computed sequentially to fill the power on the carriers of choice which is determined by the above preferences. The available power can be used by the current carrier under consideration.

In yet another aspect, a joint filling algorithm can be applied where the transmit powers are computed in a joint manner across channels. Optimization techniques can be applied. One example is a water-filling scheme. Generally, a 'down' command at 150 is applied first and carriers with the 'up' command will received transmit power at least unchanged. The remaining power is computed and distributed among the carriers with 'up' command. Transmit power on each carrier is computed in a joint manner. For example, if maximum data rate is the objective, a water-filling technique can be applied. The water-filling algorithm can assign more power to sub-channels which experience good conditions and may assign lesser or no power to poorly conditioned sub-channels, for example.

Power scaling can apply when the UE 130 is headroom limited and E-DCH transmissions are on-going, for example. For DC-HSUPA (or other protocols), maximum power scaling algorithms can be applicable as follows:

1. The UE 130 is configured with two (or more) uplink carriers and the carriers are enabled and active. If the secondary carrier is de-activated, then legacy scaling rules can apply to the primary carrier.
2. Packet sizes have been selected on the carriers via automated selection and in accordance with grants provided by the scheduler.
3. The UE 130 is headroom limited and since the maximum power constraint at the UE has to be met, power scaling has to be applied to one or both carriers. This typically happens a) During re-transmissions since the UE would not be able to re-select a new packet size to fit available headroom or b) when power control commands causes the total transmitted power across the carriers to exceed the maximum available power.

In single carrier HSUPA, the legacy power scaling algorithm can be defined as follows:

if the total UE transmit power (after applying DPCCH power adjustments and gain factors) would exceed the maximum allowed value, the UE should reduce the E-DPDCH gain factors $\beta_{ed,k}$ by an equal scaling factor to respective values $\beta_{ed,k,reduced}$ so that the total transmit power would be equal to the maximum allowed power.

if any $\beta_{ed,k,reduced}/\beta_c$ is less than $\beta_{ed,k,reduced,min}/\beta_c$, that $\beta_{ed,k}$ should be set to $\beta_{ed,k,min}$ such that $\beta_{ed,k,min}/\beta_c$=min $(\beta_{ed,k,reduced,min}/\beta_c, \beta_{ed,k,original}/\beta_c)$ and $\beta_{ed,k,reduced,min}$ is configurable by higher layers. If the total UE transmit power would still exceed the maximum allowed value, the betas are then scaled by a fixed additional scaling that is chosen to make the required transmit power about equal to the allowed value.

Any slot-level scaling of $\beta_{ed}$ or DTX of E-DPDCH is applied at layer 1 and is transparent to higher layers.

Power scaling can be broadly classified into at least two categories. Sequential Scaling includes scaling of the E-DPDCH that is performed in a sequential manner according to carrier priority. A preferred carrier is protected while the other carrier(s) is scaled until the carrier reaches the minimum power defined by threshold for that carrier. If this reduction is not sufficient, then the preferred carrier is also scaled until both carriers have reached the threshold on the respective carriers. Note the possibility to set a different threshold for each carrier. The preferred carrier can be selected as: a Carrier with lower DPCCH power; a Carrier with lower total power; or a Carrier with a higher rate, for example.

In another aspect, Parallel Scaling can be applied. This includes scaling of the E-DPDCH that is performed on the carriers in a concurrent manner. If one of the carriers reaches the minimum power set by threshold, the power can be locked in place while the data on the other carrier is scaled further until the carriers (or carrier subset) have reached the desired threshold on the respective carriers.

Note that the above scaling algorithms can apply when the $\beta_{ed,k}$ on one or both of the carriers is larger than $\beta_{ed,k,min}$. When both carriers are transmitting at their respective minimum data power and the UE transmit power still exceeds the maximum available power, then additional power reduction is achieved by about equal scaling of all the physical channels on both carriers. This is in accordance with the behavior in single carrier HSUPA when the $\beta_{ed,k,min}$ is reached.

When both carriers are transmitting at their respective minimum data power and the UE transmit power still exceeds the maximum available power, alternative schemes can also be considered where the physical channels only on the secondary carrier are scaled first before the channels on the primary carrier are scaled. In general, it can be assumed that all the channels on both carriers are scaled about equally. The terms anchor carrier and primary carrier are used interchangeably and refer to the same carrier—the one that corresponds to the serving HS-DSCH cell and the one which carries the HS-DPCCH channel.

Generally, the control channel performance can be evaluated when the above schemes are implemented. This is evaluated by comparing the CDF of the Ecp/Nt of the primary carrier since the HS-DPCCH is transmitted on the primary carrier. Since the $(C/P)_{hs}$ of the HS-DPCCH channel used remains about the same in both schemes, a comparison of the Ecp/Nt CDF is a direct indication of the performance of the HS-DPCCH channel. Since the residual BLER increases as the max transmit power restrictions become severe, the set point increases steadily. To allow for the carriers to recover from deep fades of the channel, the set point can be upper bounded to −16 dB, for example. This has the effect of freezing the set point when the UE is excessively headroom limited. The Sequential and Parallel scaling algorithms mentioned in the previous section can be studied for the following cases:

Equal packet sizes on each carrier
Un-equal packet sizes on each carrier

Note that if Sequential scaling is employed and both carriers have the same (or similar) packet-sizes (and thus the same rate), the preferred carrier is the one with the lower DPCCH power. Lower DPCCH power in this case also implies lower total power since both carriers have the same (or similar) T2Ps.

Generally, there is no appreciable difference in performance between the sequential and parallel scaling schemes in terms of coverage on the anchor and secondary carriers.

The setting of $T/P_{min}$ impacts coverage on the primary and secondary carriers. Setting $T/P_{min}=0$ on the secondary carrier improves performance on the primary carrier and vice versa. Although the coverage (and by extension—throughput) on the anchor carrier is affected by the setting of a low $T/P_{min}$, the coverage on the secondary carrier improves by a similar amount. Therefore, setting different $T/P_{min}$'s on the anchor and secondary carriers generally does not affect combined throughputs. In general, one aspect may include setting T/Pmin lower for the primary carrier, but this may not be true in practice. If there are non-scheduled transmissions that are relegated only to the primary carrier for example, then the T/Pmin on the primary carrier can be higher. Thus, the methods described herein include setting the minimum power offset of the data channel independently on each carrier.

In general, setting a low $T/P_{min}$ on the primary carrier results in higher Ecp/Nt values which correspond to better HS-DPCCH performance. This is due in part that the T/P on the primary carrier can be reduced more than that of the secondary which means that equal power scaling on the primary carrier can be avoided to a larger extent. Since equal power scaling reduces the pilot as well as the control and data channels, avoiding equal power scaling has the benefit of maintaining the pilot levels longer.

Additionally, a low $T/P_{min}$ on the primary carrier implies that traffic decoding is affected on the primary carrier. Consequently, the set point on the primary carrier can be higher than that of the secondary carrier leading to higher transmit pilot levels on the primary carrier. Due to these reasons, the performance of the control channel can be enhanced when a low $T/P_{min}$ is configured on the primary carrier whereas the combined throughput remains unaffected.

Sequential scaling performs slightly better when coverage on the anchor carrier is considered. This may be true when the $T/P_{min}$ is higher on the anchor carrier. While different $T/P_{min}$ settings on both carriers affect the performance on the anchor carrier to a slight extent, the impact can be greater when it comes to the secondary carrier. Setting low $T/P_{min}$ values on the secondary carrier can have a deleterious effect on coverage. Note however that since the data rate on the secondary carrier is less than that of the primary carrier, the combined throughputs still remains comparable for the different $T/P_{min}$ settings on both carriers.

It is noted that there is a correlation between the CDF of Ecp/Nt and the performance of the HS-DPCCH performance. As in the case of equal packet sizes, setting a low $T/P_{min}$ on the primary carrier results in higher Ecp/Nt values which corresponds to better HS-DPCCH performance. Therefore, it is proposed that the $T/P_{min}$ be configured independently for each uplink carrier.

A water-filling scheduler and an independent scheduler were tested. Both schedulers react to UPH reported in SI messages. The water-filling scheduler allocates grants on both carriers in order to maximize the total throughput. The independent scheduler assumes an equal split of UE total transmit power and allocates grant on each carrier accordingly. These two schedulers cover a wide range in terms of optimality and complexity. Two E-TFC selection algorithms were also tested—the parallel scheme based on filling both grants to the same proportion, and the greedy-filling algorithm described above. Each combination of scheduling and E-TFC selection algorithm has been studied.

Both parallel and sequential scaling algorithms can be implemented for each combination of scheduling and E-TFC selection algorithm. For the sequential scaling algorithm, the preferred carrier is the one with the lower DPCCH.

It is noted, that the sequential scaling approach offers some throughput gains; especially at the virtual cell edge. The virtual cell edge is defined as the points where the UE is reverted to single carrier mode i.e., the secondary carrier is deactivated. The gains at the virtual cell edge occur due to the fact that the sequential scaling algorithm attempts to maintain the requisite transmit power requirements on one carrier as much as possible whereas the parallel scaling approach affects both carriers concurrently. As a result, gains of almost 16% for example are observed in some cell locations due to sequential scaling. One aspect worth mentioning is that if the path-loss based carrier allocation algorithm was not used, larger throughput gains from sequential scaling can be observed for those users with higher path loss than the threshold e.g., (127 dB).

It is noted, that sequential scaling can reduce the transmit power difference to a slight extent. Thus, one can conclude that the sequential scaling algorithm offers gains at virtual cell edge areas. This improves user experience and also the system fairness. This trend is observed in the combinations of the scheduling and E-TFC selection algorithm. Thus, when the UE in DC-HSUPA is power limited, the sequential scaling algorithm can be applied where the preferred carrier is the one with the lower DPCCH power.

In summary, for DC-HSUPA (or other protocols), a T/Pmin parameter can be configured independently for each uplink carrier, where this parameter reflects a transmit power for a carrier. Test results show sensitivity to the setting of different T/Pmin on the two uplink carriers. Specifically, a low T/Pmin on the primary carrier was shown to provide improved HS-DPCCH performance. Terms such as anchor carrier and primary carrier are used interchangeably and refer to the same carrier—the one that corresponds to the serving HS-DSCH cell and the one which carrier the HS-DPCCH channel. The following observations for equal packet sizes on both carriers: There is no appreciable difference in performance between the sequential and parallel scaling schemes in terms of coverage on the anchor and secondary carriers; The setting of T/Pmin impacts coverage on the primary and secondary carriers; Setting T/Pmin=0 on the secondary carrier improves performance on the primary carrier and vice versa. Although the coverage (and by extension—throughput) on the anchor carrier is affected by the setting of a low T/Pmin, the coverage on the secondary carrier improves by the same amount. Therefore, it can be concluded that setting different T/Pmin's on the anchor and secondary carriers do not affect combined throughputs.

It can be demonstrated that sequential scaling performs better in some cases than parallel scaling in terms of user throughput in some areas of the sector. Additionally, the transmit power differentials between the two carriers are not affected one way or another by the two schemes. The transmit power differentials are affected by other facts that are more significant than the maximum power scaling schemes. Based on test results, sequential scaling can be adopted as a method for maximum power scaling when the user equipment is headroom-limited in DC-HSUPA. When the user equipment in DC-HSUPA is power limited, the sequential scaling algorithm can be applied where the preferred carrier is the one with the lower DPCCH power.

It is noted that the system 100 can be employed with an access terminal or mobile device, and can be, for instance, a module such as an SD card, a network card, a wireless network card, a computer (including laptops, desktops, personal digital assistants (PDAs)), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
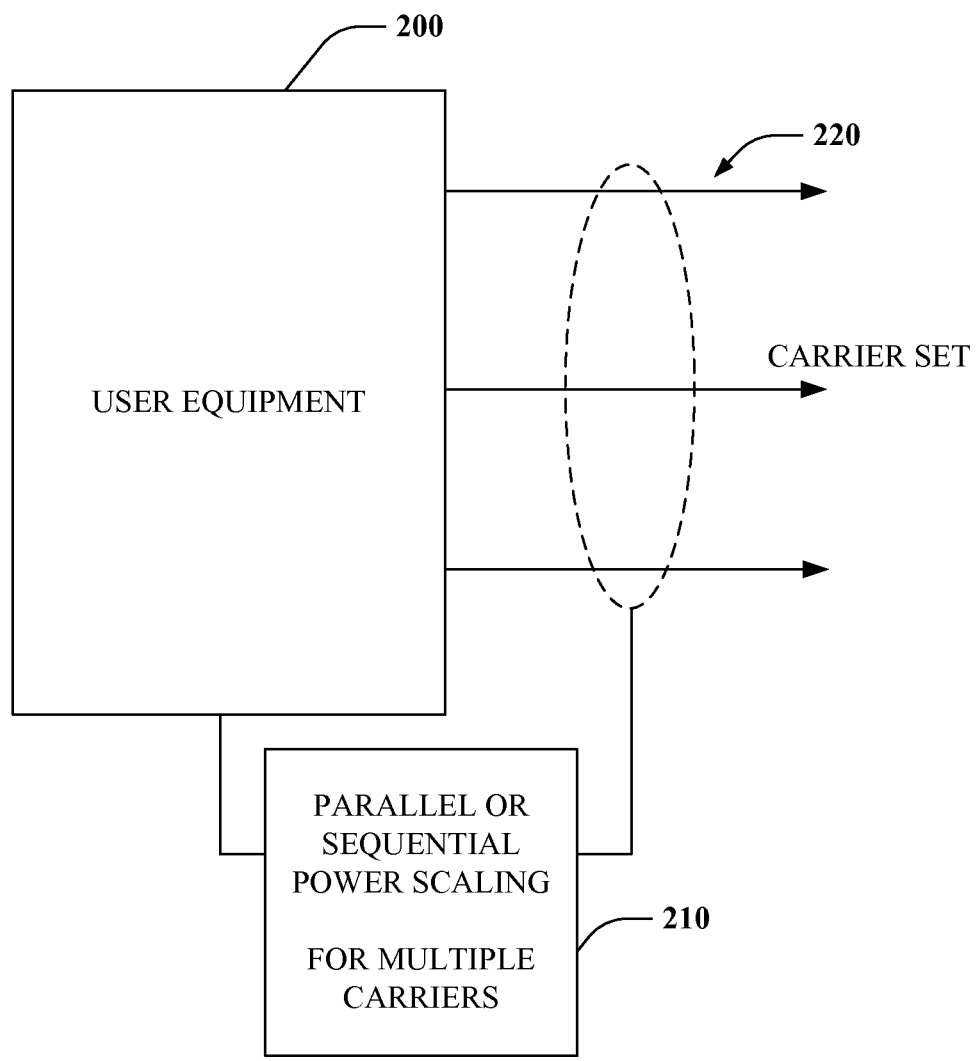
FIG. 2 is a diagram that illustrates power scaling for a multicarrier power control in a wireless communications system.

Referring now to FIG. 2, power scaling is illustrated for a multicarrier wireless system. In this aspect, user equipment 200 is shown, where power scaling 210 is applied to a multiple carrier set 220. Generally, even though all (or some) of the carriers in the set have received a "down" command, it is still possible that the user equipment 200 has exceeded a maximum allowable power output level such as can be determined by predetermined thresholds that are monitored and acted upon by the closed loop controls described above. In case where power thresholds have been exceeded, power scaling 210 can be applied to control the aggregate power of the multicarrier set 220.

As noted previously, power scaling 210 can apply when the UE 200 is headroom limited and E-DCH transmissions are on-going. For DC-HSUPA, maximum power scaling algorithms can be applicable as follows:
1. The UE 200 is configured with two (or more) uplink carriers and the carriers are enabled and active. If the secondary carrier is de-activated, then legacy scaling rules can apply to the primary carrier.
2. Packet sizes have been selected on the carriers via automated selection and in accordance with grants provided by the scheduler.
3. The UE 200 is headroom limited and since the maximum power constraint at the UE has to be met, power scaling has to be applied to one or both carriers. This typically happens a) During re-transmissions since the UE would not be able to re-select a new packet size to fit available headroom or b) When power control commands cause the total transmitted power across the carriers to exceed the maximum available power.

Power scaling 210 can be broadly classified into at least two categories. Sequential Scaling includes scaling of the E-DPDCH that is performed in a sequential manner according to carrier priority. A preferred carrier is protected while the other carrier(s) is scaled until the carrier reaches the minimum power defined by threshold for that carrier. If this reduction is not sufficient, then the preferred carrier is also scaled until both carriers have reached the threshold on the respective carriers. Note the possibility to set a different threshold for each carrier. The preferred carrier can be selected as: a Carrier with lower DPCCH power; a Carrier with lower total power; or a Carrier with a higher rate, for example.

In another aspect, Parallel Scaling can be applied. This includes scaling of the E-DPDCH that is performed on the carriers in a concurrent manner. If one of the carriers reaches the minimum power set by threshold, the power can be locked in place while the data on the other carrier is scaled further until the carriers (or carrier subset) have reached the desired threshold on the respective carriers.

Figure 3:
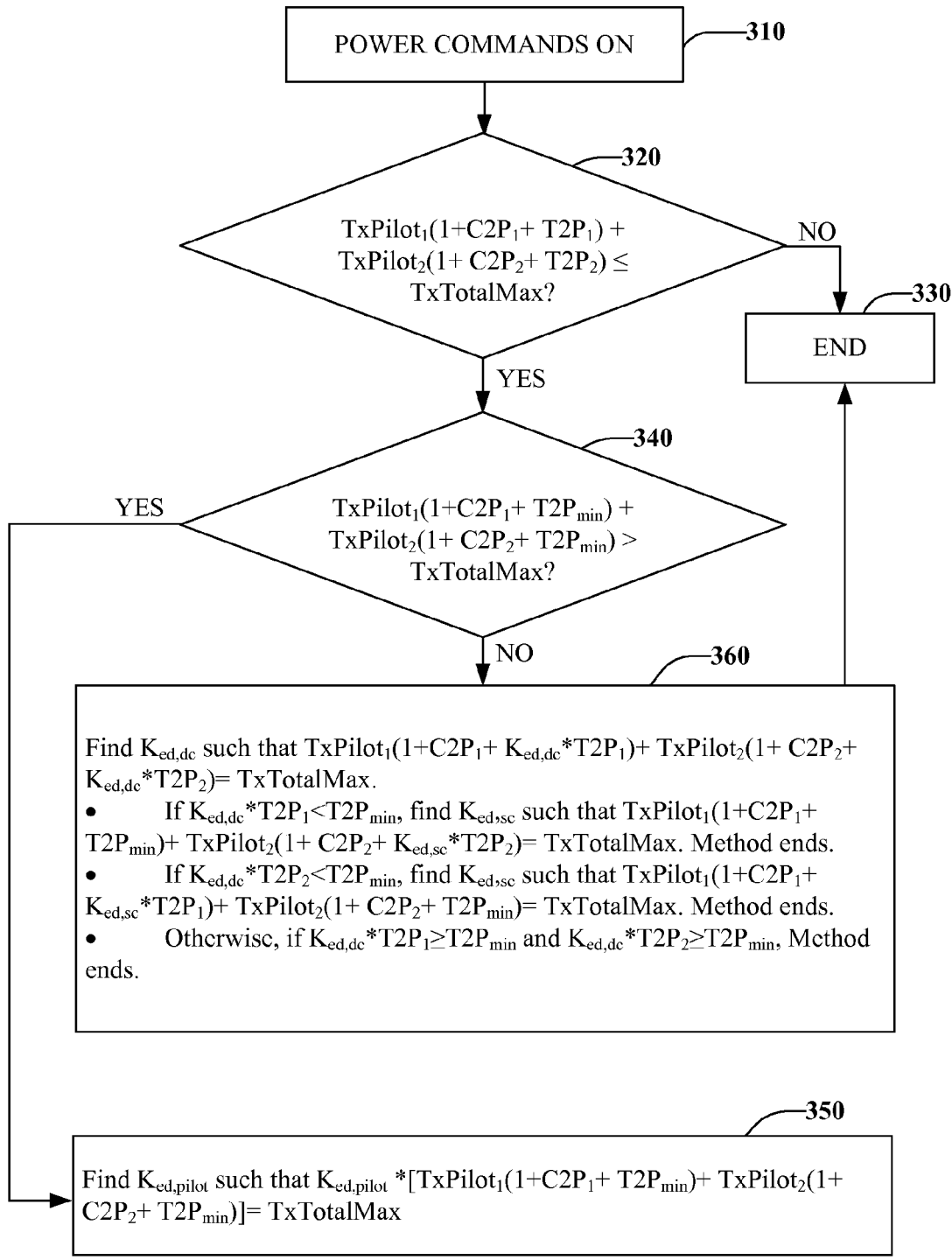
FIGS. 3-5 illustrate example power scaling methods for a wireless communication system.
Figure 4:
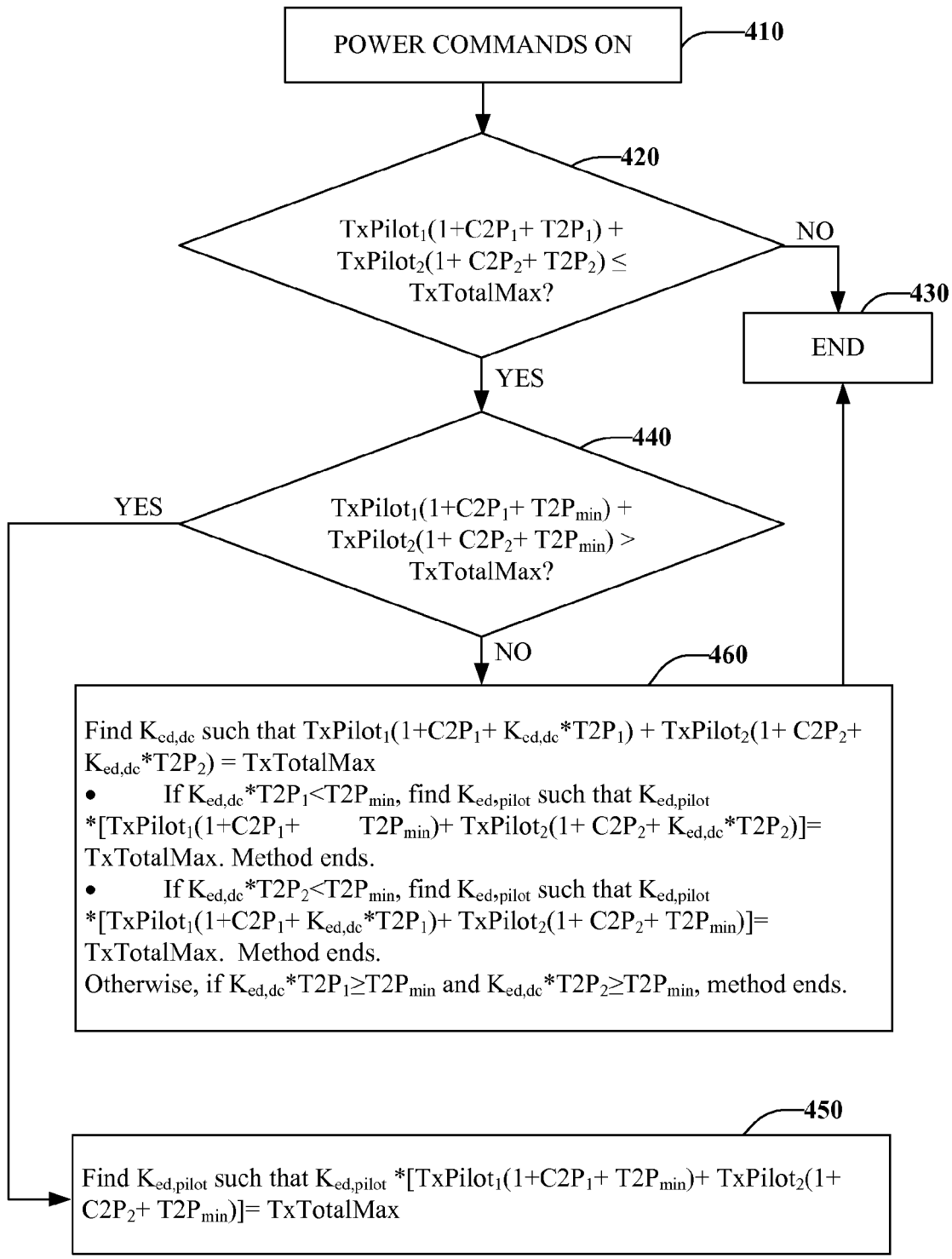
Figure 5:
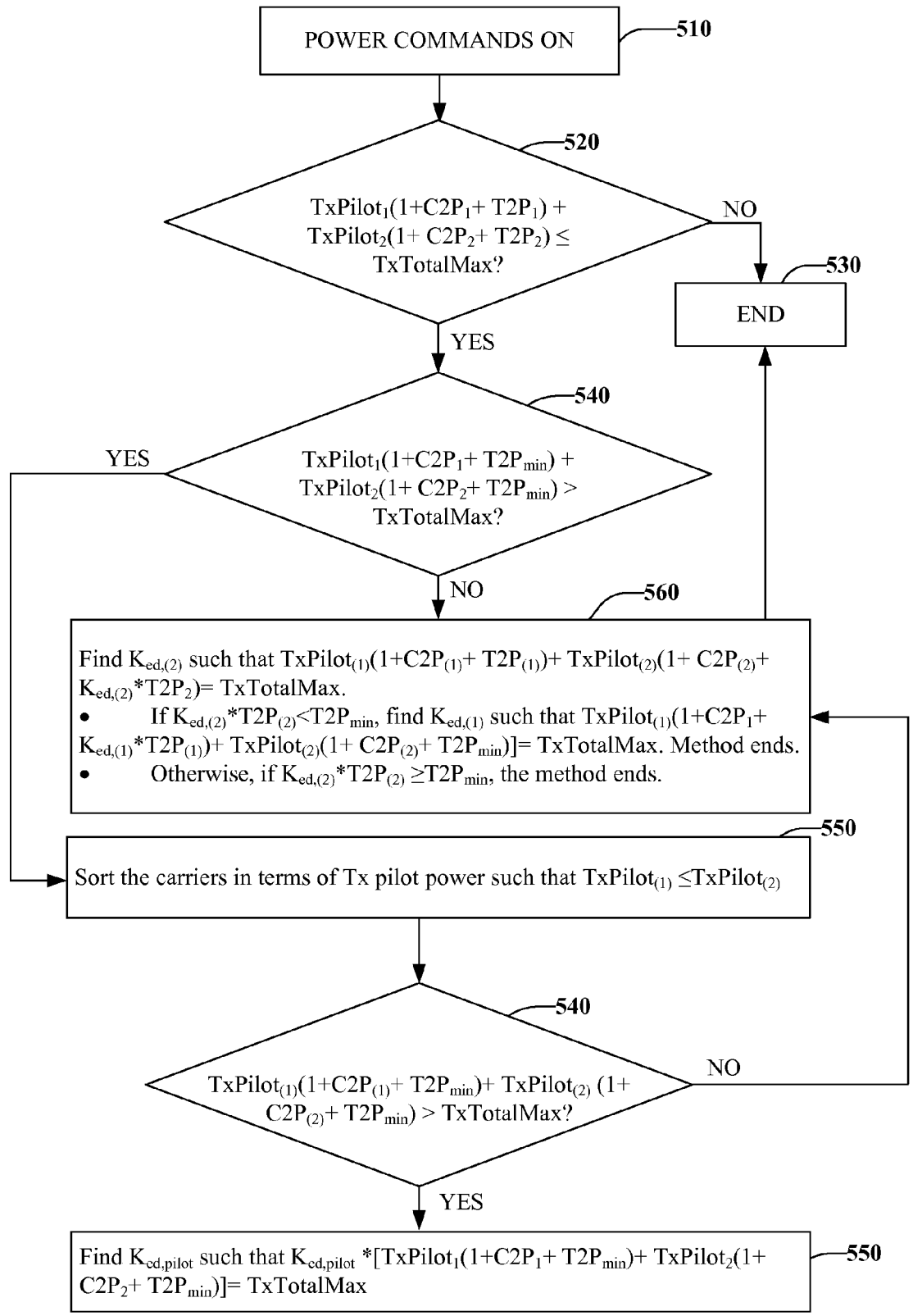

Referring now to FIG. 3-5, example power scaling methodologies are illustrated. While, for purposes of simplicity of explanation, the methodologies (and other methodologies described herein) are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter. In general, the methodologies can be implemented as processor instructions, logical programming functions, or other electronic sequence that supports independent multicarrier power control described herein.

Before proceeding, some general terminology is developed for the methods shown in FIGS. 3-5. For user equipment (UE) total transmit power can be represented as $TxTotal = TxPilot_1(1+C2P_1+T2P_1) + TxPilot_2(1+C2P_2+T2P_2)$, where $C2P_1$ includes power for high speed dedicated physical control channel (HS-DPCCH) and enhanced (E-DPCCH), and where $C2P_2$ includes power for E-DPCCH only. $C2P_1$ is control-to-pilot ratio on carrier 1 and $T2P_1$ is traffic-to-pilot ratio on carrier 1 and so forth with the subscript denoting which carrier. Also, power terms such as 'beta_ed, min', 'T/Pmin' and 'T2Pmin' can be used interchangeably.

It can be assumed no DPDCH is configured otherwise the power scaling rules can be slightly different. $T2P_{min}$ is configured by radio resource control (RRC) as the minimum T2P for the 'T2P preserving' or 'equal' power scaling. TxTotalMax is the maximum Tx power of a UE after cubic metric (CM) back-off. The power scaling can change the UE power more than 1 dB. For example, if a UE has data on only one interlace, there could be many power control (PC) up commands in between the re-transmissions. Therefore, at the first slot of the next transmission time interval (TTI) e.g., 2 milliseconds, with a retransmission, the Tx power before power scaling can be much larger than the TxTotalMax. Thus, power scaling is can be employed even if the power control commands on both carriers are 'down' due to the above conditions.

Proceeding to FIG. 3, power control commands (PC) on carriers are applied at 310. In this example, two carriers are employed but it is to be appreciated that more than two carriers can be utilized. At 320 a decision is performed where, if $TxPilot_1(1+C2P_1+T2P_1) + TxPilot_2(1+C2P_2+T2P_2) \leq TxTotalMax$, the method ends at 330, otherwise, continue to 340. If $TxPilot_1(1+C2P_1+T2P_1) + TxPilot_2(1+C2P_2+T2P_2) > TxTotalMax$ at 320, then proceed to 340 and determine if $TxPilot_1(1+C_2P_1+T2P_{min}) + TxPilot_2(1+C2P_2+T2P_{min}) > TxTotalMax$, then go to 350, otherwise, continue to 360, where:

Find $K_{ed,dc}$ such that $TxPilot_1(1+C2P_1+K_{ed,dc}*T2P_1)+TxPilot_2(1+C2P_2+K_{ed,dc}*T2P_2)=TxTotalMax$. As a check, typically should have max $(K_{ed,dc}*T2P_1, K_{ed,dc}*T2P_2) > T2P_{min}$. Note that K is a constant, 'ed' is E-DPDCH (data channel in EUL/HSUPA), and 'dc' is dual-carrier.

a. If $K_{ed,dc}*T2P_1 < T2P_{min}$, find $K_{ed,sc}$ such that $TxPilot_1(1+C2P_1+T2P_{min})+TxPilot_2(1+C2P_2+K_{ed,sc}*T2P_2)=TxTotalMax$. As a check, $K_{ed,sc}*T2P_2 > T2P_{min}$. The method ends at 330.

b. If $K_{ed,dc}*T2P_2 < T2P_{min}$, find $K_{ed,sc}$ such that $TxPilot_1(1+C2P_1+K_{ed,sc}*T2P_1)+TxPilot_2(1+C2P_2+T2P_{min})=TxTotalMax$. As a check, $K_{ed,sc}*T2P_1 > T2P_{min}$. The method ends at 330.

c. Otherwise, if $K_{ed,dc}*T2P_1 \geq T2P_{min}$ and $K_{ed,dc}*T2P_2 \geq T2P_{min}$, the method ends at 330.

At 350, find $K_{ed,pilot}$ such that $K_{ed,pilot}*[TxPilot_1(1+C2P_1+T2P_{min})+TxPilot_2(1+C2P_2+T2P_{min})]=TxTotalMax$. The method ends at 330.

Proceeding to FIG. 4, power control commands (PC) on carriers are applied at 410. In this example, two carriers are employed but it is to be appreciated that more than two carriers can be utilized. At 420 a decision is performed where, if $TxPilot_1(1+C2P_1+T2P_1)+TxPilot_2(1+C2P_2+T2P_2) \leq TxTotalMax$, the method ends at 430, otherwise, continue to 440. If $TxPilot_1(1+C2P_1+T2P_1)+TxPilot_2(1+C2P_2+T2P_2) > TxTotalMax$ at 420, then proceed to 440 and determine if $TxPilot_1(1+C2P_1+T2P_{min})+TxPilot_2(1+C2P_2+T2P_{min}) > TxTotalMax$, then go to 450, otherwise, continue to 460, where:

Find $K_{ed,dc}$ such that $TxPilot_1(1+C2P_1+K_{ed,dc}*T2P_1)+TxPilot_2(1+C2P_2+K_{ed,dc}*T2P_2)=TxTotalMax$. As a check, should typically have $max(K_{ed,dc}*T2P_1, K_{ed,dc}*T2P_2) > T2P_{min}$.

a. If $K_{ed,dc}*T2P_1 < T2P_{min}$, find $K_{ed,pilot}$ such that $K_{ed,pilot}*[TxPilot_1(1+C2P_1+T2P_{min})+TxPilot_2(1+C2P_2+K_{ed,dc}*T^2P_2)]=TxTotalMax$. The method ends at 430.

b. If $K_{ed,dc}*T2P_2 < T2P_{min}$, find $K_{ed,pilot}$ such that $K_{ed,pilot}*[TxPilot_1(1+C2P_1+K_{ed,dc}*T2P_1)+TxPilot_2(1+C2P_2+T2P_{min})]=TxTotalMax$. The method ends at 430.

c. Otherwise, if $K_{ed,dc}*T2P_1 \geq T2P_{min}$ and $K_{ed,dc}*T2P_2 \geq T2P_{min}$, the method ends at 430.

At 450, find $K_{ed,pilot}$ such that $K_{ed,pilot}*[TxPilot_1(1+C2P_1+T2P_{min})+TxPilot_2(1+C2P_2+T2P_{min})]=TxTotalMax$. The method ends at 430.

Proceeding to FIG. 5, power control commands (PC) on carriers are applied at 510. In this example, two carriers are employed but it is to be appreciated that more than two carriers can be utilized. At 520, if $TxPilot_1(1+C2P_1+T2P_1)+TxPilot_2(1+C2P_2+T2P_2) \leq TxTotalMax$, the method ends at 530, otherwise continue to 540. If $TxPilot_1(1+C2P_1+T2P_1)+TxPilot_2(1+C2P_2+T2P_2) > TxTotalMax$ at 540, then sort the carriers in terms of Tx pilot power such that $TxPilot_{(1)} \leq TxPilot_{(2)}$ at 550. Note that in the following, the carrier subscript in ( ) is the ordered index.

a. At 560, if $TxPilot_{(1)}(1+C2P_{(1)}+T2P_{min})+TxPilot_{(2)}(1+C2P_{(2)}+T2P_{min}) > TxTotalMax$, go to 570.

b. Otherwise, continue to 580.

At 580, find $K_{ed,(2)}$ such that $TxPilot_{(1)}(1+C2P_{(1)}+T2P_{(1)})+TxPilot_{(2)}(1+C2P_{(2)}+K_{ed,(2)}*T2P_2)=TxTotalMax$.

a. If $K_{ed,(2)}*T2P_{(2)} < T2P_{min}$, find $K_{ed,(1)}$ such that $TxPilot_{(1)}(1+C2P_1+K_{ed,(1)}*T2P_{(1)})+TxPilot_{(2)}(1+C2P_{(2)}+T2P_{min})]=TxTotalMax$. As a check, $K_{ed,(1)}*T2P_{(1)} \geq T2P_{min}$. The method ends at 530.

b. Otherwise, if $K_{ed,(2)}*T2P_{(2)} \geq T2P_{min}$, the method ends at 530.

At 570, find $K_{ed,pilot}$ such that $K_{ed,pilot}*[TxPilot_{(1)}(1+C2P_{(1)}+T2P_{min})+TxPilot_{(2)}(1+C2P_{(2)}+T2P_{min})]=TxTotalMax$. The method ends at 530.

The techniques processes described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 6:
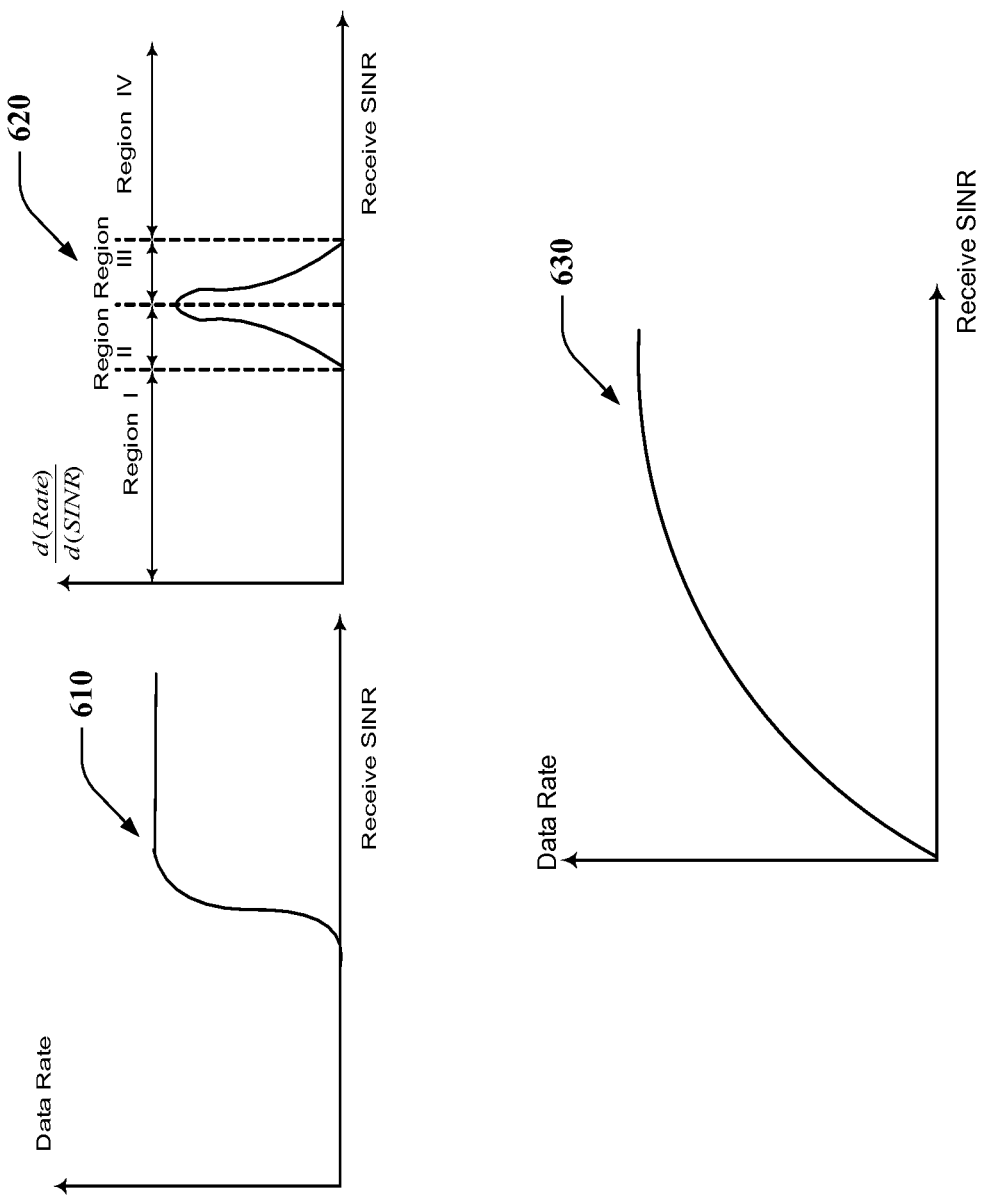
FIG. 6 illustrates various diagrams for comparisons of sequential and parallel power scaling.

Referring to FIG. 6, various diagrams are provided for comparisons of sequential and parallel power scaling. One difference between scaling techniques is the manner in which to decrease the two T2Ps when both of them are above $T2P_{min}$. For instance, the E-DPCCH power should be included in the T2P such that boosting and non-boosting are both accounted accurately.

$T2P_{min,1}$ and $T2P_{min,2}$ can be set to different values. A low $T2P_{min}$ value can result in data being scaled down more and therefore pilot and overhead can be better preserved. On the other hand, a large $T2P_{min}$ value can result in more frequent 'equal power scaling', benefiting the data channel. One option is for $T2P_{min,1} > T2P_{min,2}$ to protect the pilot on the anchor carrier (Carrier 1). In one extreme, $T2P_{min}$ can be set to a very small value to essentially turn down the 'equal power scaling'.

The optimal power scaling scheme can be analyzed. When $TxPilot_1(1+C2P_1+T2P_{original,1})+TxPilot_2(1+C2P_2+T2P_{original,2}) \leq TxTotalMax$, there is generally no need for scaling. Thus, the optimal scheme is studied when $TxPilot_1(1+C2P_1+T2P_{original,1})+TxPilot_2(1+C2P_2+T2P_{original,2}) > TxTotalMax$.

For a formulation: Let $G_1$ and $G_2$ be the path gain of the two carriers respectively. For simplicity, ignore the pilot scaling and assume $T2P_{min}=0$. Select $T2P_1$ and $T2P_2$ to maximize $R(TxPilot_1*G_1*T2P_1)+R(TxPilot_2*G_2*T2P_2)$, where R(.) is the achievable data rate at the Node B receiver. The constraints are $T2P_1 \geq 0$, $T2P_2 \geq 0$, $T2P_1 \leq T2P_{original,1}$, $T2P_1 \leq T2P_{original,2}$, $TxPilot_1(1+C2P_1+T2P_1)+TxPilot_2(1+C2P_2+T2P_2)=TxTotalMax$. The last constraint is an equality since there is generally no point in making the total power strictly lower then the allowed maximum.

Since the E-TFC is generally not allowed to change, there is not much flexibility to change the coding. Therefore R(.) is proportional to (1-PER) of the E-TFC at the chosen power. Thus, R(.) is monotonic but not concave. Furthermore, R'(.) is not monotonic as shown at 610 of FIG. 6. Based on the value and trend of R'(.), the received SINR can be separated into four different regions as shown at 620 of FIG. 6. Generally, either of the carriers may be in one of the four regions depending on the T2P scaling. Since T2P can not increased beyond $T2P_{original}$, which is determined by the E-TFC selection based on the headroom information, most likely neither carrier is in Region IV. The SINR range for Region II and III may be narrow due to Turbo codes behavior, although the rage may be widened by HARQ. If both carriers are in Region III, water-filling is optimal. However, the difference in data rate and pilot power are considered for the optimal solution. Since R'(.) may be decreasing rapidly in this region, greedy-filling probably won't be a close approximation to water-filling. Therefore, substantially equal-scaling of T2P on both carriers may lead to better results. Greedy-filling is optimal if both carriers are in Region I or II. In normal systems with reasonable E-TFC selection, this should not happen often. In summary, the optimal T2P scaling may not have clear structure to facilitate the search or indicate simple approximate algorithms.

In both E-TFC selection and Node B scheduling, the coding is the variable to choose. Therefore, the concavity and water-filling are used. Greedy-filling is also attractive since it is close to water-filling. The concavity is illustrated in the plot at 630 of FIG. 6. However, since no coding can be changed in power scaling, the concavity may be lost. The optimal power scaling, if found by exhaustive search, may not have clear structure to simplify the search. Therefore, it is expected that the various power control schemes may be suboptimal. When both T2P are far from the minimum values, and if E-TFCs can be selected such that the original required power is close to maximum when power scaling is needed, parallel back-off may have better performance.

During the lifetime of a packet, there are multiple power control periods. Therefore, the max power scaling algorithm may be run multiple times. This is a classic instance of sequential stochastic decision problem. The optimal decision rule depends on where the current slot stands in the whole HARQ process, the past history in terms of accumulated energy, the required energy of the packet and channel evolution path. The max power scaling resides at the UE transmitter. It does not have the information on the accumulated power at the receiver, nor the precise required energy. It has limited observation to the channel variation. Hence, the optimal decision is tedious to compute as it involves many integrals to cover the uncertainties. Furthermore, the optimal rule is not stationary in the sense that it can depend on the position in the finite HARQ duration. Combining these factors, and the desire to have a stationary and simple policy, it is expected that the performance among reasonable algorithms will not be dramatically different.

Figure 7:
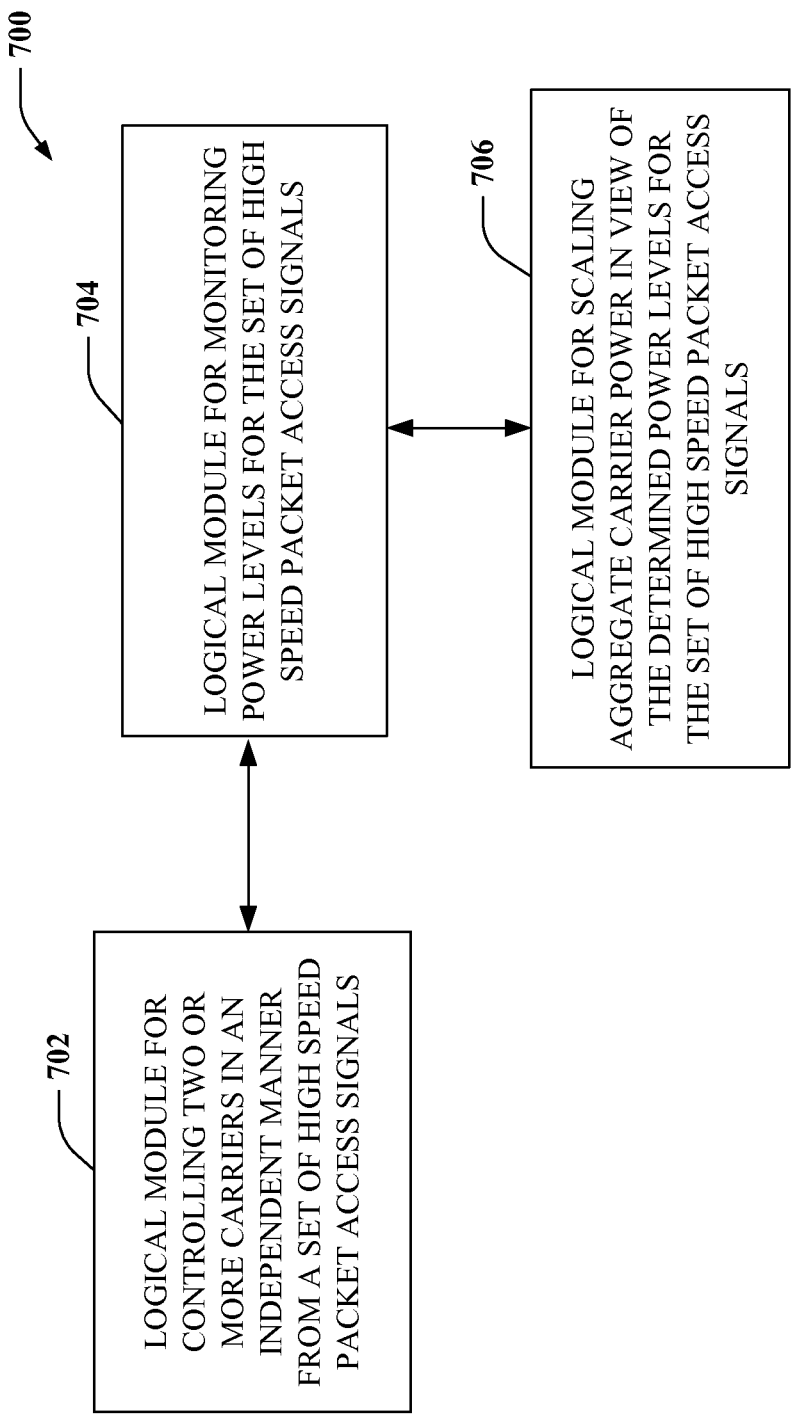
FIG. 7 illustrates an example logical module for alternative multicarrier power control.

Turning now to FIG. 7, a system is provided that relates to wireless signal processing. The system is represented as a series of interrelated functional blocks, which can represent functions implemented by a processor, software, hardware, firmware, or any suitable combination thereof Referring to FIG. 7, a wireless communication system 700 is provided. The system 700 includes a logical module 702 or means for controlling two or more carriers in an independent manner from a set of high speed packet access signals. This includes a logical module 704 or means for monitoring power levels for the set of high speed packet access signals. This also includes a logical module 706 or means for scaling aggregate carrier power in view of the determined power levels for the set of high speed packet access signals.

Figure 8:
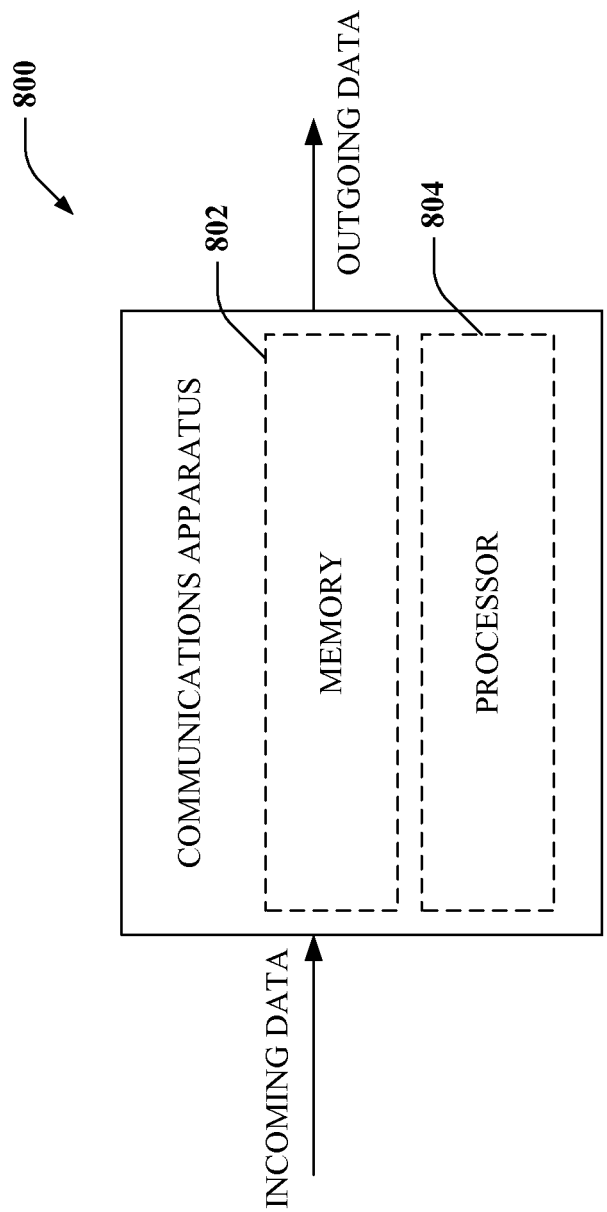
FIG. 8 illustrates an example communications apparatus that employ multicarrier power control.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
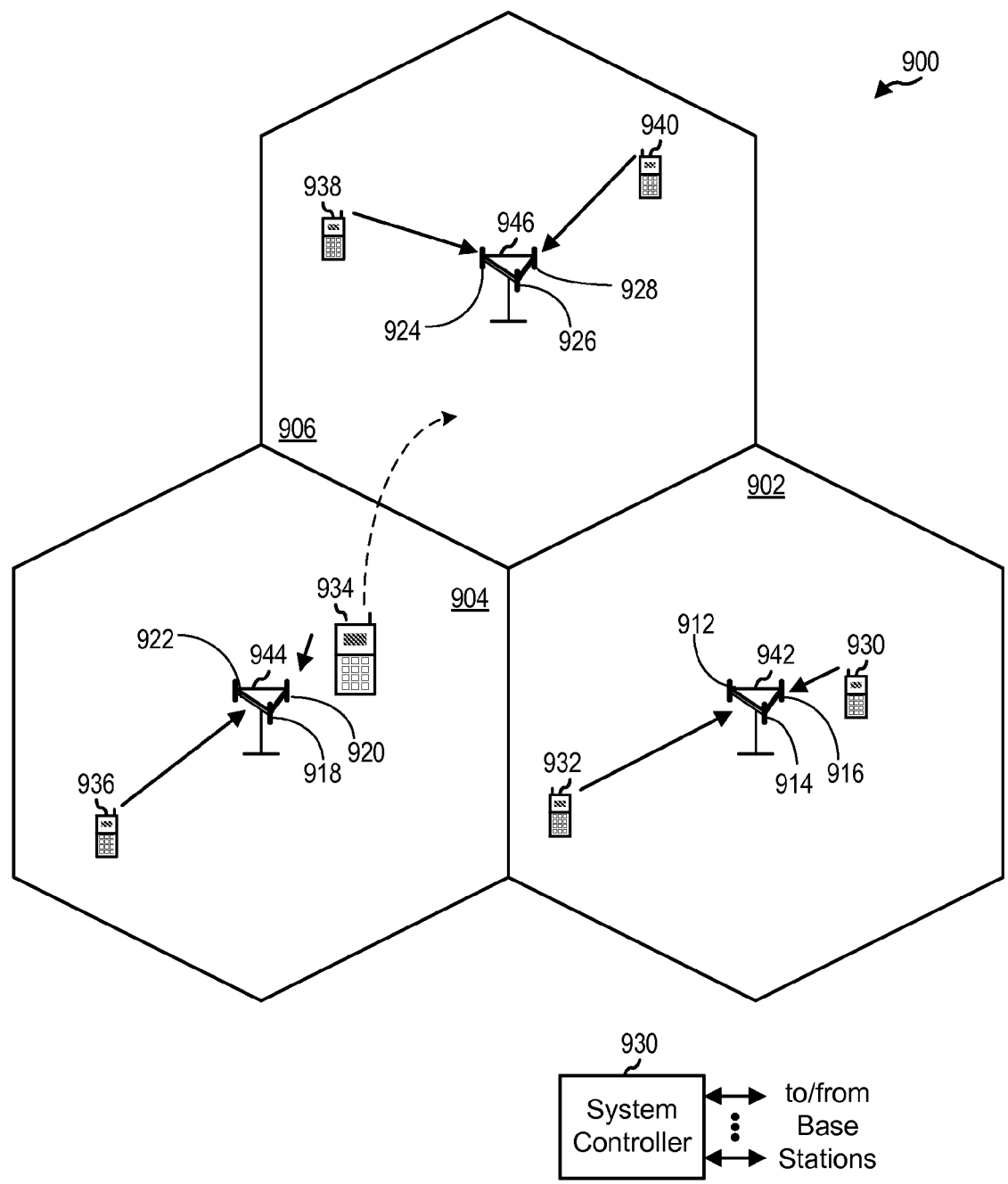
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
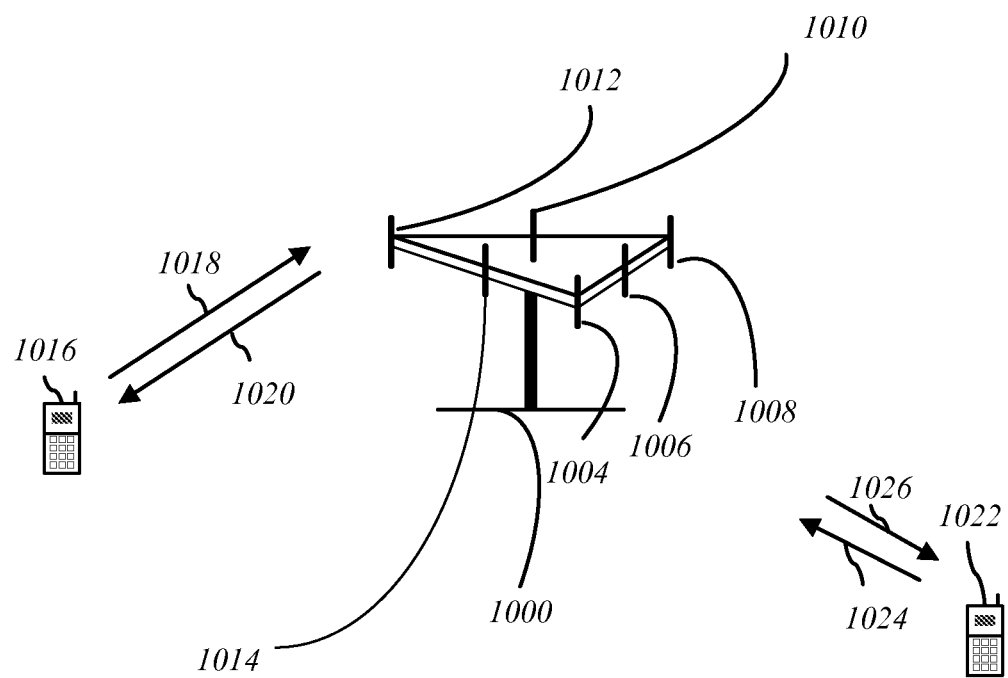
FIGS. 10 and 11 illustrate example communications systems.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
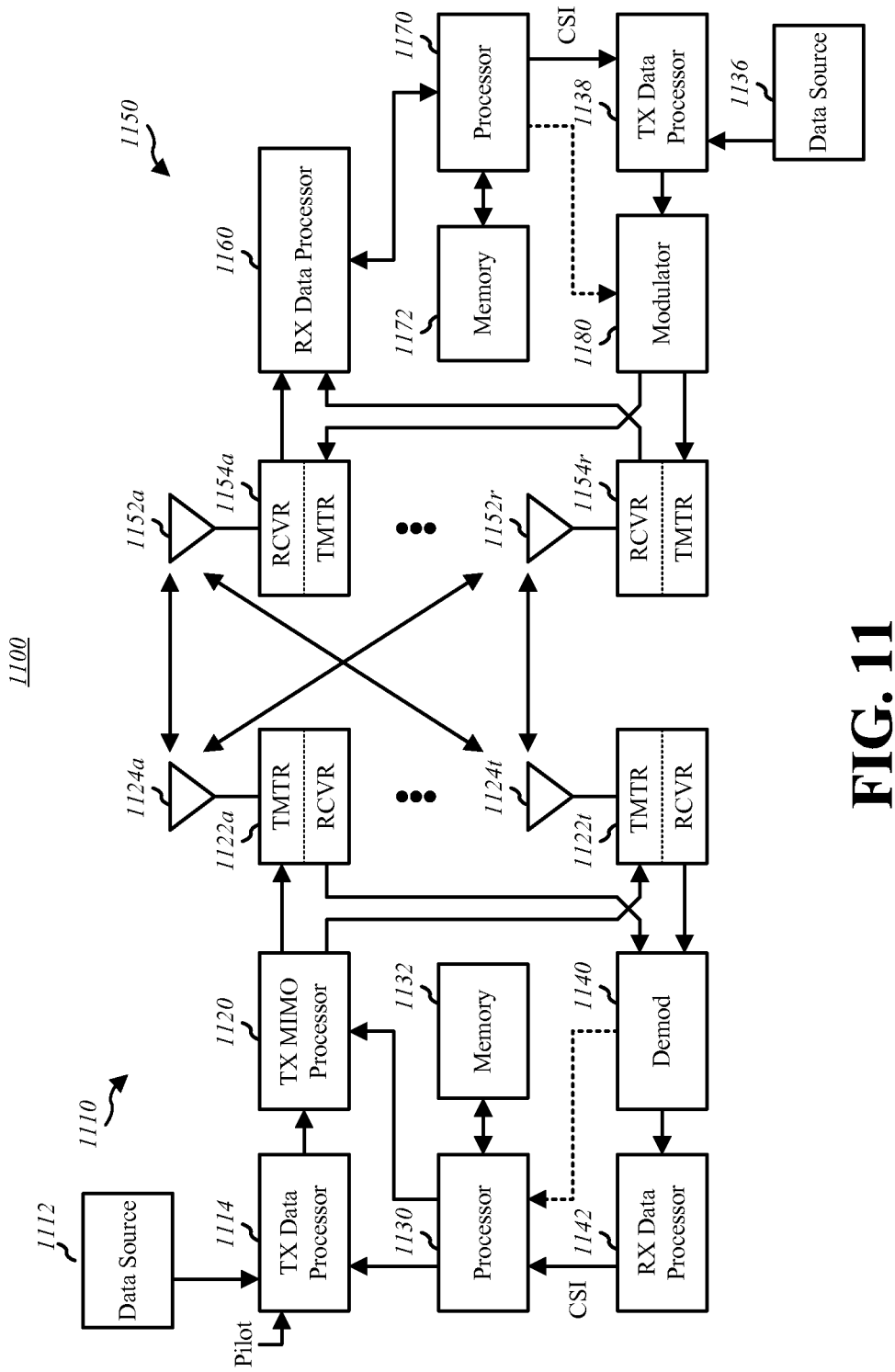

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122*a* through 1122*t*. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122*a* through 1122*t* are then transmitted from NT antennas 1124*a* through 1124*t*, respectively.

At receiver system 1150, the transmitted modulated signals are received by NR antennas 1152*a* through 1152*r* and the received signal from each antenna 1152 is provided to a respective receiver (RCVR) 1154*a* through 1154*r*. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which precoding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154*a* through 1154*r*, and transmitted back to transmitter system 1110. Parameters include resource allocation parameters, interference condition parameters, signal strength parameters, signal quality parameters, quality.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

Figure 12:
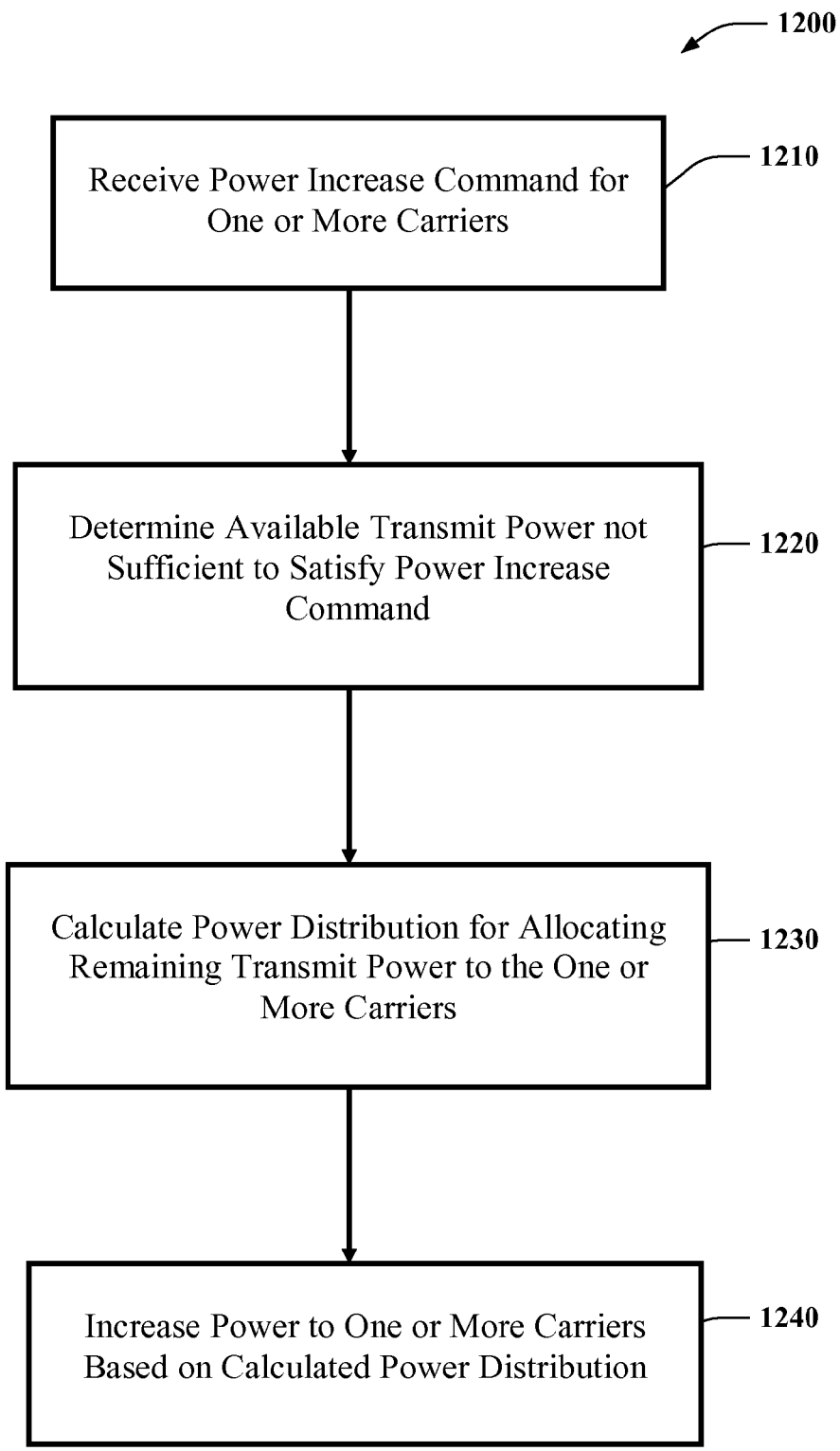
FIGS. 12 and 13 illustrate alternative power scaling and distribution systems.

FIG. 12 is a flow diagram 1200 where the UE follows a "greedy filling" rule in which most or all of the available transmit power is assigned to one or more preferred carriers. In this aspect, a command to increase power to one or more carriers is received by a UE at 1210. The power increase command may be accompanied by a command to reduce power to one or more other carriers. The UE responds by first reducing transmit power to any carrier assigned a 'down' command. At 1220, the UE determines whether it has enough power to satisfy the 'up' power command for all of the carriers specified by the 'up' commands. If not, then any carrier with an 'up' command in the RPC will have its transmit power at least unchanged. At 1230, the UE then calculates a power distribution for the carriers having an 'up' command. In one aspect, the power distribution calculation is based on one or more parameters, such as the channel conditions for each uplink carrier, a grant for each uplink carrier, a current data rate used by each uplink carrier or the status of the carrier (anchor vs. non-anchor). One or more of the aforementioned parameters are used to distribute the available power to those uplink carriers needing an increase in power. The channel condition is measured by the transmit power of the pilot (DPCCH). Lower transmit power of pilot indicates better channel condition. Therefore, in one aspect, a carrier having a lower transmit power will be given greater priority to have its transmit power increased. Finally, the UE adjusts one or more power levels to one or more carriers/channels in accordance with the calculated power distribution at 1240.

Such a power distribution might assign a power increase to a first carrier, a power increase to a second carrier, but no power increase to a third through fifth carrier. In other words, this particular power distribution assigns transmit power increases in a hierarchical fashion, until no more power is available to be assigned. The hierarchy is calculated using the parameters noted above. It should be understood that in some power control environments, the power command received by a UE may not only command a power level increase, but it may also dictate how much of a power increase is desired. For example, in some communication systems, a power command might specify that a first carrier should have its power level increased by a first amount and a second carrier should have its power level increased by a second amount. When allocating the available power by the UE to these two channels, it might be the case that the power level increase desired by the power increase command for the first carrier is satisfied, but the power level increase desired by the power increase command can only be met partially. In that case, the first carrier's transmit power in increased by the full amount and the second carrier's power is increased by the remaining available power, even if it does not satisfy the power 'up' command fully.

In another aspect, the power allocation among the carriers is computed in a joint optimization. In this aspect, transmit power is first reduced to any carrier/channel identified as needing a reduction in transmit power, i.e., any carrier/channel having a 'down' command issued in its RPC. Then, any carrier/channel with an 'up' command will have its transmit power at least unchanged. The remaining transmit power is computed and then distributed among the carriers with an 'up' command. One technique for distributing the remaining power is referred to as the "water-filling among carriers" technique.

The "water-filling among carriers" technique is described as follows. The UE will maximize its instantaneous data rate by allocating power among the carriers with power control 'up' commands. The optimization results in more power allocated to the carrier with lower transmit pilot power. Qualitatively, this is similar as in the greedy filling algorithm. One difference is that the UE may not assume all the power available for the better channels. Instead, the effect from the additional power on the increase in data rate is monitored. Without the step size constraint, the power allocation achieves a similar rate of increase in the data rates on all the carriers with 'up' commands.

Figure 13:
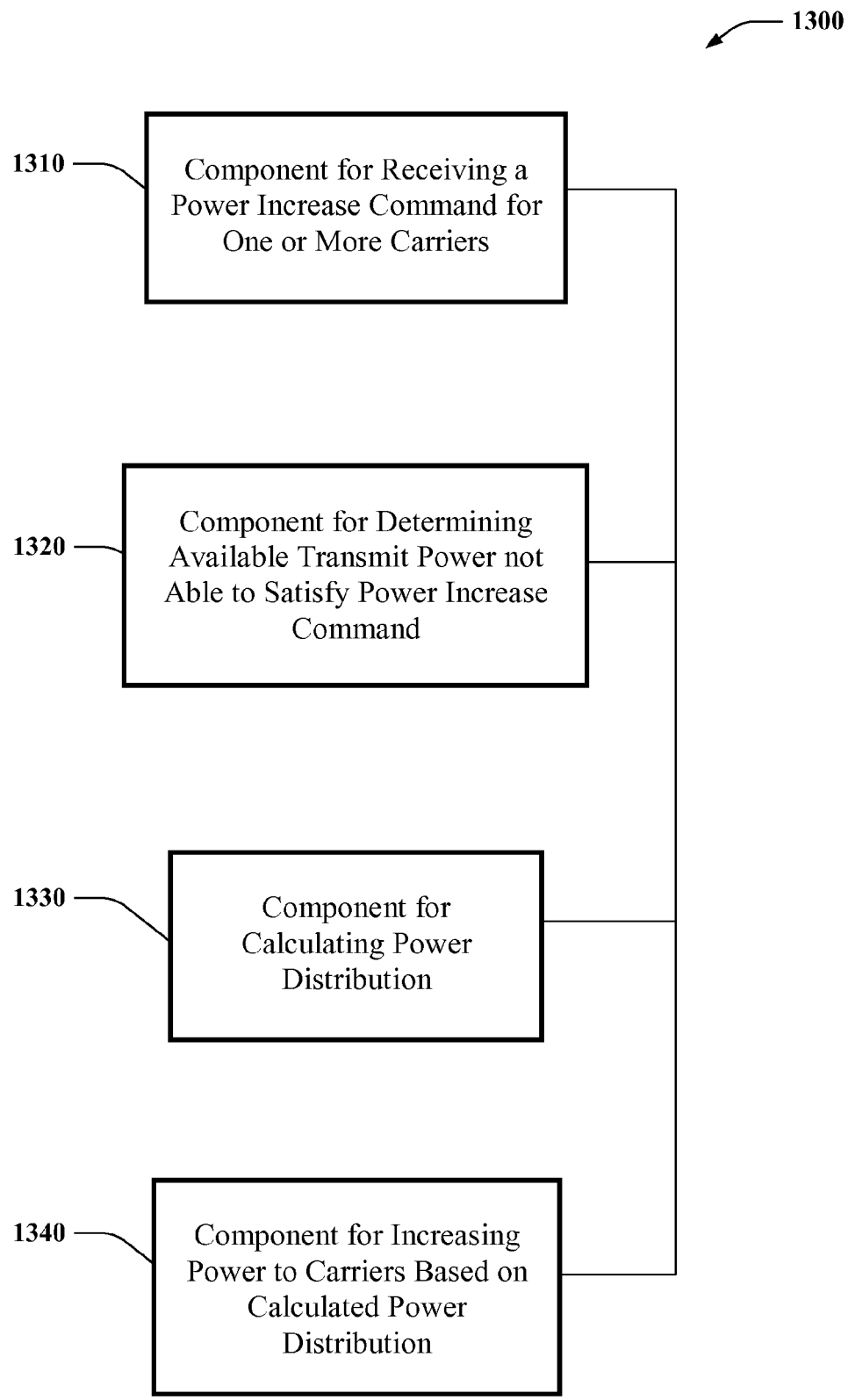

FIG. 13 is a component diagram illustration for an apparatus 1300 for controlling power in a HSUPA system. In one aspect, an apparatus operable in wireless communication system is provided. This includes a logical module 1310 or means for receiving a power increase command for one or more carriers. This also includes a logical module 1320 or means for determining that the available transmit power is not sufficient to satisfy the power increase command. The apparatus 1300 also includes a logical module 1330 or means for calculating a power distribution for allocating the available transmit power to the one or more carriers. This also includes a logical module 1340 or means for increasing power to the one or more carriers based on the calculated power distribution.

In another aspect, a method for wireless communications is provided. The method includes providing independent power controls for two or more carriers from a set of packet access signals; monitoring power across the two or more carriers to determine power levels for the set of packet access signals; and automatically scaling at least one of the independent power controls in view of the power levels for the set of packet access signals. The method includes analyzing a combined transmit pilot power in view of a total maximum power value. This includes analyzing and adjusting power for a group of carriers in a parallel manner among the carriers. This also includes analyzing and adjusting power for a group of carriers in a sequential manner among the carriers. The method includes configuring a minimum power T/Pmin parameter via a radio resource control and employing the T/Pmin parameter as a threshold in a sequential power scaling routine, a parallel power scaling routine, or a greedy power scaling routine. The T/Pmin parameter is configured independently for each respective uplink carrier. The method includes setting a low value for the T/Pmin parameter on a primary carrier to improve a dedicated physical control channel (DPCCH) performance. The method also includes scaling the two or more carriers according to a preference that includes a channel quality parameter, a grant, a current data rate, a status of an anchor carrier, or a status of a non-anchor carrier. This includes holding a power value on a preferred carrier while scaling down a power on at least one other carrier to a minimum threshold. The method also includes determining if at least one carrier has reached has reached a minimum power, holding the power on the at least one carrier, and scaling data on at least one carrier until a set of carriers has reached a minimum power threshold. This can include scaling a channel on a secondary carrier before scaling another channel on a primary carrier. The method includes transmitting equal or unequal packet sizes on the secondary carrier or the primary carrier. This includes employing a water-filling scheduler or an independent scheduler in accordance with the independent power controls.

In another aspect, a communications apparatus is provided. This includes a memory that retains instructions for providing independent power controls to two or more carriers from a set of packet access signals, determining power across the two or more carriers to determine power levels for the set of packet access signals, and scaling the independent power controls in view of the power levels for the set of packet access signals; and a processor that executes the instructions.

In another aspect, a computer program product is provided. This includes a computer-readable medium that includes code for controlling power, the code comprising: code for causing a computer to control power for two or more carriers from a set of packet access signals; code for causing a computer to monitor power across the two or more carriers to determine power levels for the set of packet access signals; and code for causing a computer to collectively scale power for the two or more carriers in view of the power levels for the set of packet access signals. This also includes code for causing a computer to adjust power for a group of carriers in a sequential or a parallel manner. This can include controlling power jointly between carriers.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH), for example.

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH), for example.

Other terms/components include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

As used in this application, the terms "component," "module," "system," "protocol," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for wireless communications, comprising:
providing independent closed-loop power controls for each of two or more carriers from a set of packet access signals;
receiving, over a first carrier of the two or more carriers, one or more first radio power control (RPC) commands indicating whether to increase or decrease transmit power;
receiving, over a second carrier of the two or more carriers, one or more second RPC commands indicating whether to increase or decrease transmit power;
monitoring power across the two or more carriers based at least in part on receiving the one or more first RPC commands over the first carrier and receiving the one or more second RPC commands over the second carrier to determine power levels for the set of packet access signals;
automatically scaling at least one of the independent closed-loop power controls in view of the power levels for the set of packet access signals and in view of the one or more first RPC commands and the one or more second RPC commands; and
concurrently adjusting power for a group of carriers based at least in part on the automatically scaling at least one of the independent closed-loop power controls, wherein the group of carriers comprises at least two of the two or more carriers, and wherein concurrently adjusting the power for the group of carriers includes locking the power for at least one carrier in the group of carriers when the power reaches a minimum power while scaling the power for at least another carrier in the group of carriers.

2. The method of claim 1, further comprising analyzing a combined transmit pilot power in view of a total maximum power value.

3. The method of claim 1, further comprising configuring a minimum transmit power T/Pmin parameter via a radio resource control.

4. The method of claim 3, further comprising employing the T/Pmin parameter as a threshold in a sequential power scaling routine, a parallel power scaling routine, or a greedy power scaling routine.

5. The method of claim 3, wherein the T/Pmin parameter is configured independently for each respective uplink carrier.

6. The method of claim 3, wherein configuring the T/Pmin parameter comprises setting a low value for the T/Pmin parameter on a primary carrier to improve a dedicated physical control channel (DPCCH) performance.

7. The method of claim 1, wherein the automatically scaling the at least one of the independent closed-loop power controls is according to a preference that includes a channel quality parameter, a grant, a current data rate, a status of an anchor carrier, or a status of a non-anchor carrier.

8. The method of claim 1, wherein the concurrently adjusting power for the group of carriers comprises holding a power value on a preferred carrier while scaling down a power on at least one other carrier to a minimum threshold.

9. The method of claim 1, wherein the concurrently adjusting power for the group of carriers comprises determining if the at least one carrier has reached the minimum power, holding a power on the at least one carrier, and scaling data on the at least one carrier until a set of carriers has reached a minimum power threshold.

10. The method of claim 1, further comprising scaling a channel on a secondary carrier before scaling another channel on a primary carrier.

11. The method of claim 10, further comprising transmitting equal or unequal packet sizes on the secondary carrier or the primary carrier.

12. The method of claim 1, further comprising employing a water-filling scheduler or an independent scheduler in accordance with the independent closed-loop power controls.

13. The method of claim 1, wherein the concurrently adjusting power for the group of carriers comprises determining that one of the carriers in the group of carriers reaches a minimum power, locking further power adjustment on the one of the carriers, and scaling down data on one or more other carriers in the group of carriers until a threshold minimum power is reached on the one or more other carriers.

14. A communications apparatus, comprising:
a memory that retains instructions for:
providing independent closed-loop power controls to each of two or more carriers from a set of packet access signals;
receiving, over a first carrier of the two or more carriers, one or more first radio power control (RPC) commands indicating whether to increase or decrease transmit power;
receiving, over a second carrier of the two or more carriers, one or more second RPC commands indicating whether to increase or decrease transmit power;
determining power across the two or more carriers based at least in part on receiving the one or more first RPC commands over the first carrier and receiving the one or more second RPC commands over the second carrier to determine power levels for the set of packet access signals;
scaling the independent closed-loop power controls in view of the power levels for the set of packet access signals and in view of the one or more first RPC commands and the one or more second RPC commands; and
concurrently adjusting power for a group of carriers based at least in part on the scaling at least one of the independent closed-loop power controls, wherein the group of carriers comprises at least two of the two or more carriers, and wherein concurrently adjusting the power for the group of carriers includes locking the power for at least one carrier in the group of carriers when the power reaches a minimum power while scaling the power for at least another carrier in the group of carriers; and
a processor that executes the instructions.

15. The communications apparatus of claim 14, further comprising instructions for analyzing a combined transmit pilot power in view of a total maximum power value.

16. The communications apparatus of claim 14, further comprising instructions for configuring a minimum transmit power T/Pmin parameter via a radio resource control.

17. The communications apparatus of claim 16, further comprising instructions for employing the T/Pmin parameter as a threshold in a sequential power scaling routine, a parallel power scaling routine, or a greedy power scaling routine.

18. The communications apparatus of claim 16, wherein the T/Pmin parameter is configured independently for each respective uplink carrier.

19. The communications apparatus of claim 16, wherein the instructions for configuring the T/Pmin parameter comprise instructions for setting a low value for the T/Pmin parameter on a primary carrier to improve a dedicated physical control channel (DPCCH) performance.

20. The communications apparatus of claim 14, wherein the instructions for scaling the independent closed-loop power controls are according to a preference that includes a channel quality parameter, a grant, a current data rate, a status of an anchor carrier, or a status of a non-anchor carrier.

21. The communications apparatus of claim 14, wherein the instructions for concurrently adjusting power for the group of carriers comprise instructions for holding a power value on a preferred carrier while scaling down a power on at least one other carrier to a minimum threshold.

22. The communications apparatus of claim 14, wherein the instructions for concurrently adjusting power for the group of carriers comprise instructions for determining if the at least one carrier has reached the minimum power, holding the power on the at least one carrier, and scaling data on the at least one carrier until a set of carriers has reached a minimum power threshold.

23. The communications apparatus of claim 14, further comprising instructions for scaling a channel on a secondary carrier before scaling another channel on a primary carrier.

24. The communications apparatus of claim 23, further comprising instructions for transmitting equal or unequal packet sizes on the secondary carrier or the primary carrier.

25. The communications apparatus of claim 14, further comprising instructions for employing a water-filling scheduler or an independent scheduler in accordance with the independent closed-loop power controls.

26. The communications apparatus of claim 14, wherein the instructions for concurrently adjusting power for the group of carriers comprise instructions for determining that one of the carriers in the group of carriers reaches a minimum power, locking further power adjustment on the one of the carriers, and scaling down data on one or more other carriers in the group of carriers until a threshold minimum power is reached on the one or more other carriers.

27. A communications apparatus, comprising:
   means for controlling two or more carriers in an independent closed-loop manner from a set of packet access signals;
   means for receiving, over a first carrier of the two or more carriers, one or more first radio power control (RPC) commands indicating whether to increase or decrease transmit power;
   means for receiving, over a second carrier of the two or more carriers, one or more second RPC commands indicating whether to increase or decrease transmit power;
   means for monitoring power levels based at least in part on receiving the one or more first RPC commands over the first carrier and receiving the one or more second RPC commands over the second carrier to determine power levels for the set of packet access signals;
   means for scaling aggregate carrier power in view of the power levels for the set of packet access signals and in view of the one or more first RPC commands and the one or more second RPC commands; and
   means for concurrently adjusting power for a group of carriers based at least in part on means for scaling the aggregate carrier power, wherein the group of carriers comprises at least two of the two or more carriers, and wherein the means for concurrently adjusting the power for the group of carriers includes means for locking the power for at least one carrier in the group of carriers when the power reaches a minimum power while scaling the power for at least another carrier in the group of carriers.

28. The communications apparatus of claim 27, wherein the means for concurrently adjusting adjusts the power for the group of carriers at least in part by determining that one of the carriers in the group of carriers reaches a minimum power, locking further power adjustment on the one of the carriers, and scaling down data on one or more other carriers in the group of carriers until a threshold minimum power is reached on the one or more other carriers.

29. A non-transitory computer-readable medium that includes code for controlling power, the code comprising:
   code for causing a computer to independently control power for two or more carriers from a set of packet access signals using closed-loop power control;
   code for causing a computer to receive, over a first carrier of the two or more carriers, one or more first radio power control (RPC) commands indicating whether to increase or decrease transmit power;
   code for causing a computer to receive, over a second carrier of the two or more carriers, one or more second RPC commands indicating whether to increase or decrease transmit power;
   code for causing a computer to monitor power across the two or more carriers based at least in part on receiving the one or more first RPC commands over the first carrier and receiving the one or more RPC second commands over the second carrier to determine power levels for the set of packet access signals;
   code for causing a computer to concurrently scale power for the two or more carriers in view of the power levels for the set of packet access signals and in view of the one or more first RPC commands and the one or more second RPC commands, wherein concurrently scaling the power for the two or more carriers includes locking the power for at least one of the two or more carriers when the power reaches a minimum power while scaling the power for at least another one of the two or more carriers.

30. The non-transitory computer-readable medium of claim 29, wherein the code for causing the computer to concurrently scale scales the power for the two or more carriers at least in part by determining that one carrier of the two or more carriers reaches a minimum power, locking further power adjustment on the one carrier, and scaling down data on one or more other carriers of the two or more carriers until a threshold minimum power is reached on the one or more other carriers.

* * * * *